(12) United States Patent
Watanabe

(10) Patent No.: US 6,771,879 B1
(45) Date of Patent: Aug. 3, 2004

(54) VIDEO PROCESSOR FOR PRODUCING STORED VIDEO KEY SIGNALS TO BE USED FOR SUPERIMPOSING TEXT OR THE LIKE ON BACKGROUND IMAGES

(75) Inventor: Yuichi Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 721 days.

(21) Appl. No.: 09/697,082

(22) Filed: Oct. 27, 2000

(30) Foreign Application Priority Data

Oct. 27, 1999 (JP) .......................................... 11-305788

(51) Int. Cl.[7] .............................. H04N 5/91; H04N 7/00
(52) U.S. Cl. ........................ 386/46; 348/590; 348/591
(58) Field of Search ................................ 348/590, 591; 386/1, 45, 40, 95, 125, 126

(56) References Cited

U.S. PATENT DOCUMENTS

| 5,107,252 | A | * | 4/1992 | Traynar et al. | ............. | 345/634 |
| 5,301,026 | A | * | 4/1994 | Lee | ............. | 348/584 |
| 6,020,931 | A | * | 2/2000 | Bilbrey et al. | ............. | 348/584 |
| 6,259,488 | B1 | * | 7/2001 | Trethewey | .................. | 348/578 |
| 6,441,864 | B1 | * | 8/2002 | Minami et al. | ............. | 348/584 |

FOREIGN PATENT DOCUMENTS

JP          6-36579         5/1994

* cited by examiner

Primary Examiner—Chris Kelley
Assistant Examiner—Alicia M. Duggins
(74) Attorney, Agent, or Firm—Young & Thompson

(57) ABSTRACT

A video processor produces video and key signals to be processed by a television production switcher for superimposing text or the like on a background image. The video processor has a key generator for receiving an input video signal and an input key signal and selecting one of these signals and shaping waveforms of the selected signal. Responsive to a first control signal, the input video signal is stored in a first frame memory and read during a later frame interval. Responsive to a second control signal, the output signal of the key generator is stored in a second frame memory and read during a later frame interval. A delay time corresponding to the processing time of the key generator is introduced to the input video signal. A first switch selects one of the outputs of the delay circuit and the first frame memory, and a second switch selects one of the outputs of the key generator and the second frame memory. A shadow insertion circuit is provided for receiving the output signals of the first and second switches for inserting a shadow to the received signals.

4 Claims, 3 Drawing Sheets

VIDEO PROCESSOR FOR PRODUCING STORED VIDEO KEY SIGNALS TO BE USED FOR SUPERIMPOSING TEXT OR THE LIKE ON BACKGROUND IMAGES

BACKGROUND OF THE INVENTION

1. Field of the Invention

The present invention relates to a superimposing technique for use in television production switchers for superimposing text or the like on background images. The present invention is particularly concerned with a video processor for producing video and key signals to be used in television production switchers.

2. Description of the Related Art

Television production switchers are currently provided with memories known a video store, a key store and a frame store for storing video signals and key signals for producing superimposed images using the stored video signals. These memories are provided separately from a video processor. As shown in FIG. 1, a prior art video processor is comprised of two field-delay memories designated 102 and 103. Input video signal is used in two ways, one being directly coupled to the field-delay memory 102 and the other to a superimpose key signal generator 101 to which an input key signal is also supplied. Key generator 101 is responsive to a select signal for selecting one of its input signals and shapes the waveform of the selected signal to eliminate noise. Field-delay memory 103 is connected to the output of the key generator 101. The output of each field-delay memory thus represents the signal that is one-field earlier than its current input signal. The effect of this delay is to reposition the video and key signals to their original scanning line. The output signals of field-delay memories 102 and 103 are coupled to a known shadow inserter 104.

Since the field-memories are used exclusively for repositioning the video and key signals, read/write control is not possible, and hence the contents of these memories cannot be used for superimposing during subsequent frames.

SUMMARY OF THE INVENTION

It is therefore an object of the present invention to provide a latch circuit with a reduced number of circuit nodes and a flip-flop implemented with the latch circuit.

According to the present invention, there is provided a video processor for producing video and key signals to be processed by a television production switcher for superimposing text or the like on a background image, the video processor comprising a key generator for receiving an input video signal and an input key signal and selecting one of the input video and key signals and shaping waveforms of the selected signal and producing an output signal, a first frame memory for receiving the input video signal and storing the received signal and reading the stored video signal according to a first control signal applied thereto, and a second frame memory for receiving the output signal of the key generator and storing the received signal and reading the stored signal according to a second control signal applied thereto.

The video processor further includes a delay circuit for introducing a delay time corresponding to processing time of the key generator to the input video signal, a first switch for selecting one of an output signal of the delay circuit and an output signal of the first frame memory, and a second switch for selecting one of the output signal of the key generator and an output signal of the second frame memory. A shadow insertion circuit is provided for receiving output signals of the first and second switches for inserting a shadow to the received signals.

BRIEF DESCRIPTION OF THE DRAWINGS

The present invention will be described in further detail with reference to the accompanying drawings, in which.

DETAILED DESCRIPTION

Figure 1:
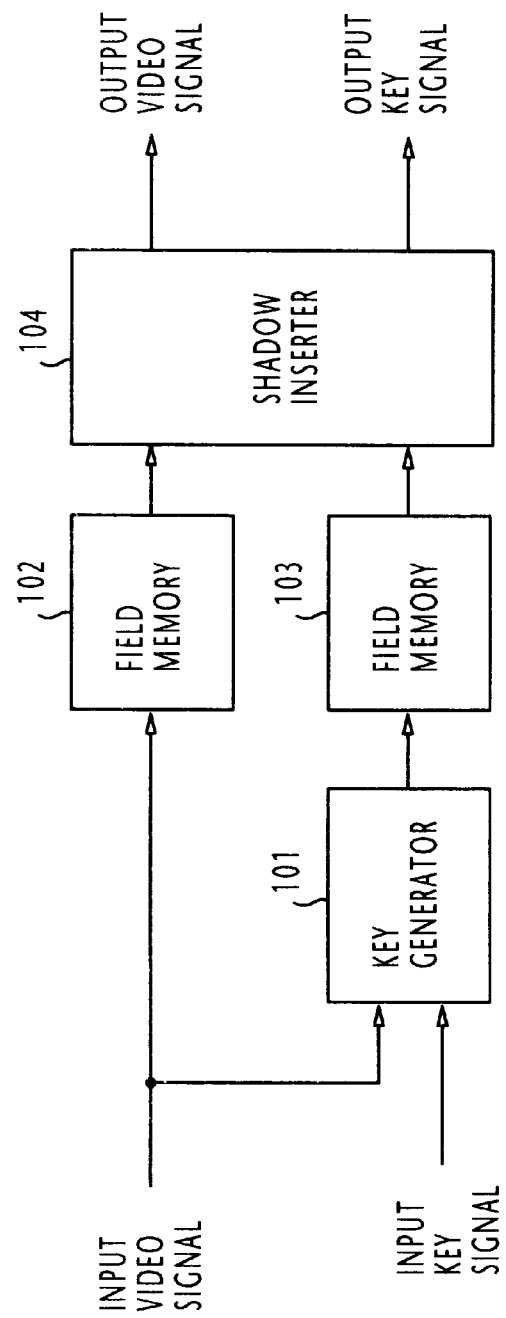
FIG. 1 is a block diagram of a prior art video processor.
Figure 2:
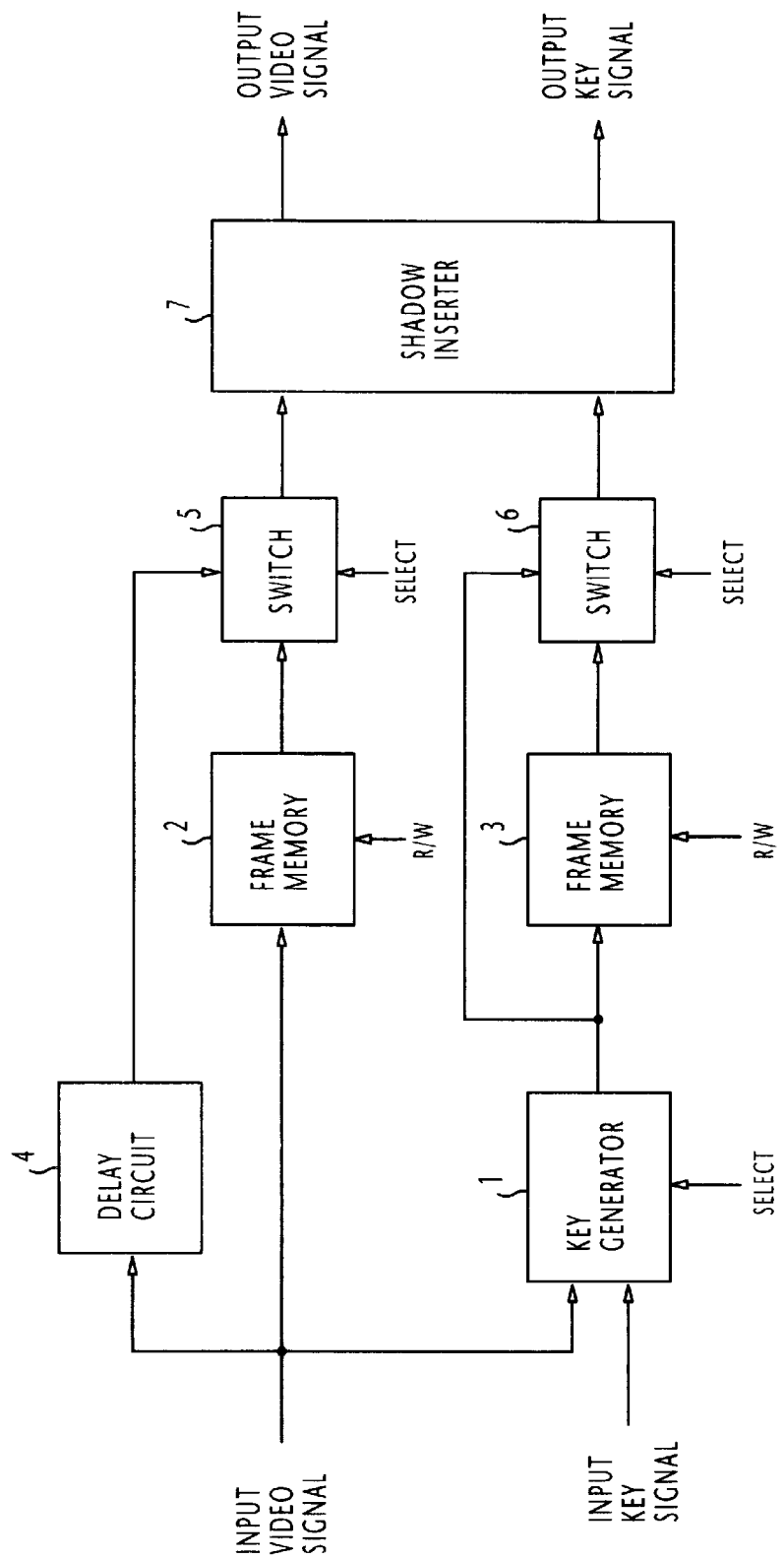
FIG. 2 is a block diagram of a video processor latch circuit according to the present invention.
Figure 3A:
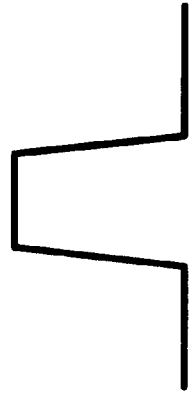
FIGS. 3a and 3b show waveforms of the input and output signals of a key generator.
Figure 3B:
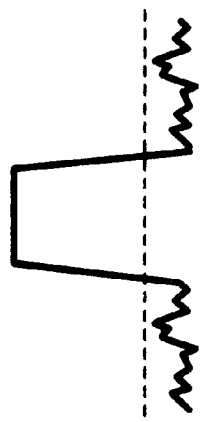

In FIG. 2, there is shown a video processor according to the present invention. The video processor produces signals which will be used in a television production switcher or the like for superimposing text or the like on a background image. The video processor comprises frame memories 2 and 3. Read/write control signals are supplied to these frame memories. According to these control signals the memories 2 and 3 are controlled for storing input signals during desired frames and reading stored signals during desired frames. A key generator 1 is responsive to a control signal applied thereto from an external circuit for selecting one of an input video signal and an input key signal, shown in FIG. 3a, and eliminating the noise of the selected signal and shaping its waveform and correcting its amplitude level, as shown in FIG. 3b, for application to the frame memory 3 and further to a switch 6 to which the output of frame memory 3 is also applied.

The input video signal is further applied to the frame memory 2 and to a delay circuit 4. Delay circuit 4 introduces a delay time corresponding to the processing time of the key generator 1. The outputs of frame memory 2 and delay circuit 4 are coupled to a switch 5.

Switches 5 and 6 are controlled by a control signal applied thereto from an external circuit for selecting one of their input signals. The provision of these switches selectively allows a pair of video and key signals of a previous frame to be used for superimposing in the current frame or a pair of current video and key signals to be used for superimposing in the current frame.

Figure 4A:
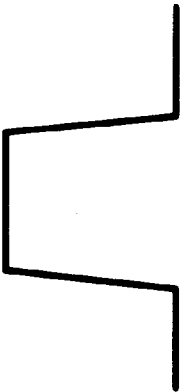
FIGS. 4a and 4b show waveforms of the input and output signals of a shadow inserter.
Figure 4B:
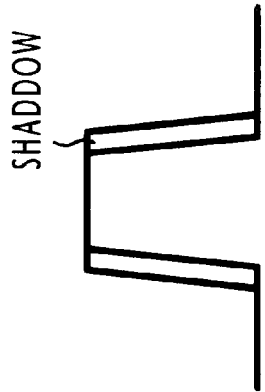

The outputs of the switches 5 and 6 are coupled to a known shadow inserter 7 where a shadow (FIG. 4a) is inserted to the selected video and key signals as shown in FIG. 4b in a manner as described in detail in Japanese Patent No. 1,912,754.

Advantageous features of using frame memories 2 and 3 is that existing video processors can be modified by installing a pair of field memories. Existing field memories can be advantageously utilized to produce frame memories.

The use of switches 5 and 6 allow superimposing to be performed on input video and key signals without erasing the contents of the frame memories.

What is claimed is:

1. A video processor for processing video and key signals to be processed by a television production switcher for superimposing text on a background image, the video processor comprising:

a key generator for receiving an input video signal and an input key signal and selecting one of the input video and key signals and shaping waveforms of the selected signal and producing an output signal;

a first frame memory for receiving said input video signal and storing the received signal and reading the stored video signal according to a first control signal applied thereto;

a second frame memory for receiving the output signal of said key generator and storing the received signal and reading the stored signal according to a second control signal applied thereto;

a delay circuit for introducing a delay time corresponding to processing time of said key generator to said input video signal;

a first switch for selecting one of an output signal of said delay circuit and an output signal of said first frame memory; and a second switch for selecting one of the output signal of said key generator and an output signal of said second frame memory.

2. The video processor of claim 1, further comprising a shadow insertion circuit for receiving output signals of said first and second switches for inserting a shadow to the received signals.

3. The method of producing video and key signals to be processed by a television production switcher for superimposing text on a background image, the method comprising the steps of:

a) receiving an input video signal and an input key signal and selecting one of the input video and key signals and shaping waveforms of the selected signal and producing an output key signal;

b) responsive to a first control signal, storing said input video signal in a first frame memory and reading the stored video signal from the first frame memory to produce a first frame-delay signal;

c) responsive to a second control signal, storing said output key signal in a second frame memory and reading the stored video signal from the second frame memory to produce a second frame-delayed signal;

d) introducing a delay time corresponding to processing time of step (a) to said input video signal;

e) selecting one of the video signal delayed by step (d) and said first frame-delayed signal; and f) selecting one of the output key signal and said second frame-delayed signal.

4. The method of claim 3, further comprising the step of inserting a shadow to the signals selected by steps (e) and (f).

* * * * *